(12) United States Patent
Westcott et al.

(10) Patent No.: US 6,264,853 B1
(45) Date of Patent: Jul. 24, 2001

(54) COMPLEX CONTAINING LIGNAN, PHENOLIC AND ALIPHATIC SUBSTANCES FROM FLAX AND PROCESS FOR PREPARING

(75) Inventors: Neil D. Westcott; David Paton, both of Saskatoon (CA)

(73) Assignee: Agriculture and Agri-Food Canada, Saskatoon (CA)

( * ) Notice: Subject to any disclaimer, the term of this patent is extended or adjusted under 35 U.S.C. 154(b) by 0 days.

(21) Appl. No.: 09/334,557

(22) Filed: Jun. 21, 1999

(51) Int. Cl.[7] .............................. C07G 1/00; C08L 97/00
(52) U.S. Cl. ........................ 252/1; 530/500; 530/507; 426/430; 426/479; 426/482; 426/484; 536/4.1; 536/128
(58) Field of Search .................... 530/500, 507; 426/430, 479, 482, 484; 536/4.1, 128; 252/1

(56) References Cited

U.S. PATENT DOCUMENTS 5,169,660   12/1992   Collins et al. .
5,484,595   1/1996    Ikeya et al. .
5,705,618   1/1998    Westcott et al. .

OTHER PUBLICATIONS

Bambagiotti–Alberti, Massimo et al., "Revealing the Mammalian Lignan Precursor Secoisolariciresinol Diglucoside in Flax Seed by Ionspray Mass Spectrometry", Rapid Communications in Mass Spectrometry, vol. 8, 595–598 (1994).

*Primary Examiner*—Jill Warden
*Assistant Examiner*—Monique T. Cole

(57) ABSTRACT

A substanially pure chemically bound complex is derived from flax containing secoisolariciresinol diglucoside, cinnamic acid glycosides and hydroxy methyl glutaric acid. The complex is obtained by preparing an aqueous aliphatic alcoholic extract from flax and subjecting this aqueous extract to ultrafiltration whereby low molecular weight species remain with a filtrate and higher molecular weight species comprising the separated complex are retained.

15 Claims, 6 Drawing Sheets

COMPLEX CONTAINING LIGNAN, PHENOLIC AND ALIPHATIC SUBSTANCES FROM FLAX AND PROCESS FOR PREPARING

FIELD OF THE INVENTION

This invention relates to a novel process for purifying a complex containing lignan, phenolic and aliphatic substances from flax and to the novel complex thus obtained.

BACKGROUND OF THE INVENTION

At the present time flaxseed is primarily grown for its oil content for use mainly as an industrial oil. Increasingly flaxseed is also used as a source of edible oil for use in health supplements and margarine. Conventional flaxseed is rich in unsaturated fatty acids in its triglyceride oil and is thus subject to oxidative polymerization.

The principal components of flaxseed that are of commercial importance are oil and meal cake. The oil is used industrially in the manufacture of linoleum and in some paints and varnishes. The meal left after the oil has been substantially removed is utilized as a component in animal feeds. Reports are also available describing a polysaccharide fraction and possible uses. These include the use of flaxseed mucilage as a laxative. Recently, Westcott and Muir (U.S. Pat. No. 5,705,618) have described a process for the extraction, isolation and purification of a chemical belonging to the lignan class of compounds that is contained in flaxseed. Lignans are naturally occurring substances that are formed by dimerization of cinnamoyl alcohols. The principal lignan found in flaxseed is secoisolariciresinol diglucoside, referred to hereinafter as SDG.

The first report of SDG occurring in flaxseed was by Bakke and Klostermann, "A New Diglucoside from Flaxseed", Proceedings of the N. Dakota Academy of Science 10:18–22 (1956). No physiological activities were reported for this substance at that time. These authors isolated SDG in a multi-step process involving extraction of the defatted seed with ethanol-dioxane, and concentration of the extract to a sirup. The resulting sirup was poured into petroleum ether, causing the separation of a heavy brown plastic material which was subsequently dissolved in aqueous ethanol. This alcoholic solution was then acidified to pH 3.0 and poured into ice-water. The precipitate which formed, coagulated, settled and was collected and dried under reduced pressure. The precipitate has been variously described as 'tan polymeric powder' and as a 'brown, amorphous, gum-like substance'. The precipitate was treated with sodium or barium methoxide in methanol and the liberated SDG was isolated after chromatographic purification.

Considerable interest in SDG has developed following reports of physiological activity of either whole flaxseed or purified SDG. It was demonstrated nearly 30 years ago that when flaxseed was consumed as part of the human diet, increased levels of the so-called mammalian lignans, enterolactone and enterodiol, were found in urine. It has subsequently been reported that flaxseed is very abundant in precursors to these mammalian lignans. Indeed flaxseed or its defatted meal produced 75 times more mammalian lignans than the next source, a seaweed and over 100 times more than more common foodstuffs. It was further observed by Stitch et al., "Excretion, isolation and structure of a new phenolic constituent in female urine", Nature 287: 738–740 (1980) that the amount of mammalian lignans was greatest in the luteal phase of the reproductive cycle. In addition, Aldercreutz et al, "Excretion of the lignans enterolactone and enterodiol and of equol in omnivorous and vegetarian postmenopausal women and in women with breast cancer", Lancet 1295–1299 (1982) reported that the levels of mammalian lignans were lower in urine of women with breast cancer than in healthy women.

Within the last ten years numerous researchers have reported on the physiological effects of either flaxseed or SDG. Thompson, "Anticarcinogenic effect of a mammalian lignan precursor from flaxseed", Proc. 55th Flax Institute of U.S.A., Fargo, N.Dak., 46–50 (1994) has described the effects of flaxseed on the initiation and promotional stages of mammary tumorigenesis. Additional reports have been published on the effect of SDG and flax-oil on mammary tumorigenesis. Other reports from Thompson have detailed the effects of flaxseed or SDG on colon cancer. Clark in U.S. Pat. No. 5,827,256 has also reported on the benefits of SDG to patients suffering from lupus nephritis. Prasad in U.S. Pat. No. 5,846,944 has recently described the effects of SDG in reducing the development of hypercholesterolemic atherosclerosis in animal model experiments. Further, Prasad has also reported that SDG has benefits in diabetes mellitus. Both Thompson and Prasad have separately reported that SDG has antioxidative properties.

A second class of compounds reported to be present in flax seed can generally be referred to as phenolic acids. Specifically, coumaric acid (4-glucosyl-cinnamic acid), caffeic acid (3-hydroxy-4-glucosyl-cinnamic acid) are reported constituents of the complex from flaxseed containing SDG. It is known that phenolic acids of this class of compounds and their derivatives, have in vitro activity as antioxidants. Furthermore compounds of this type have known physiological activities related to tyrosine kinase inhibition. Surprisingly Westcott and Muir (U.S. Pat. No. 5,705,618) have found a third phenolic acid glycoside is also present, namely ferulic acid glycoside(3-methoxy-4-glucosyl-cinnamic acid). Flaxseed contains an additional compound, hydroxymethyl glutaric acid (HMGA). HMGA, isolated from sources other than flax, has been found by Siddiqi and Beg (U.S. Pat. No. 3,629,449) to have hypocholesteremic properties.

While whole flaxseed or its ground counterpart may be incorporated into the human diet, the amount of such incorporation may be restricted by regulation. Even if not restricted by regulation, the high oil content and the polysaccharide mucilage content would contribute to excessive caloric intake and increased laxation respectively. Further, flaxseed is known to contain cyanide-containing compounds known as cyanogenic glycosides, those found in flaxseed being liminarin, linustatin and neolinustatin. These compounds if consumed in excess over a long period in time can result in goitrogenic problems and damage to other human organs.

It is an object of the present invention to isolate the valuable components of flax without the undesirable components, including cyanogenic glucosides.

SUMMARY OF THE INVENTION

According to one embodiment of the present invention an aqueous aliphatic alcohol extract is obtained from commercial flax, e.g. from flaxseed or flax meal. This aqueous extract is subjected to ultrafiltration whereby low molecular weight species remain with the filtrate and higher molecular weight species are retained. By proper selection of the filtration medium, it has been found that it is possible to retain in substantially pure form a complex comprising secoisolariciresinol diglucoside (SDG), cinnamic acid glucosides and hydroxy methyl glutaric acid (HMGA). The small molecular weight species that remain with the filtrate include amino acids, small peptides, sugars and salts as well as the cyanogenic glucosides, all of which are residual from the metabolic pool of the initial flaxseed.

The ultrafiltration is preferably carried out for a size exclusion of 30,000 Daltons or greater, e.g. 30,000 to 100,000 Daltons. Generally it is in the range of 30,000 to 50,000 Daltons.

A variety of ultrafilters may be used including filters in the form of flat sheets, spiral wound, supported tubes or hollow fiber membranes or other configurations. Such filters are typically made from synthetic polymers, cellulose or ceramics. A preferred ultrafilter for use in the invention is a membrane through which the aqueous extract is passed, e.g. a regenerated cellulose membrane. Particularly good results are obtained when the membrane is in the form of a spiral wound membrane. Ultrafiltration techniques are described, for instance, in U.S. Pat. Nos. 4,963,356 and 4,716,120.

It is also possible to use a column containing a solid support of a type commonly referred to as either size exclusion or gel permeation resins, such as Sephadex LH-20. Such resins selectively allow more rapid passage of substances of larger molecular weight in preference to those substances of lower molecular weight. Thus, the gel retains the salts, cyanogenic glycosides, amino acids, small peptides and the like while allowing the larger sized complex to pass through.

It is advantageous in some instances to use a combination of an ultrafiltration membrane and a size exclusion resin. Thus, the aqueous alcoholic extract may first be passed through a membrane once or several times to remove a substantial proportion of the lower molecular weight substances. Then the extract with reduced content of lower molecular weight substances is fed through a column containing size exclusion resin to remove the remainder of the lower molecular weight substances and collect the complex substantially free from the lower molecular weight substances.

According to a further embodiment of the invention, the complex in substantially pure form comprising SDG, cinnamic acid glucosides and HMGA is a novel material which can be used as is or in the form of a liquid concentrate or a powder.

The retentate containing the novel complex obtained by the ultrafiltration is preferably concentrated by known means, such as evaporation under reduced pressure, to reduce the content of alcohol and the complex is recovered as a liquid concentrate. It is also possible to recover the concentrate as a dried powder by known means, such as spray drying, drum drying, freeze drying, etc. The final dry product typically contains less than 5% moisture and has the appearance of a pale off-white solid. The powder typically contains up to 50% SDG, up to 25% total cinnamic acid glucosides and up to 10% HMGA, with less than 1% nitrogen.

The aliphatic alcohol used for the initial extraction may be selected from the group consisting of methanol, ethanol, propanol, isopropanol, butanol, etc. Preferably the extraction is carried out using ethanol and it may conveniently be carried out at room temperature, although the extraction temperature is not critical.

By isolating the complex of this invention in substantially pure form using only the aqueous aliphatic alcoholic extraction and ultrafiltration, any contamination or other damage of the complex is avoided. For instance, in the process of U.S. Pat. No. 5,705,618, the alcoholic extract was further subjected to a base-catalyzed hydrolysis to liberate the lignans. This destroys the complex such that the separation of a pure complex is no longer possible.

The products of this invention are particularly valuable as nutraceuticals and may be used, for instance, in tablet or capsule form for human usage. The product of the invention may also be incorporated into formulated foodstuffs as a functional food. A further application of the product would be usage in animal care or animal feed. The complex is believed to confer the well documented benefits of its component parts found in whole flaxseed, the source of the complex.

DESCRIPTION OF THE PREFERRED EMBODIMENTS

EXAMPLE 1

Figure 1A:
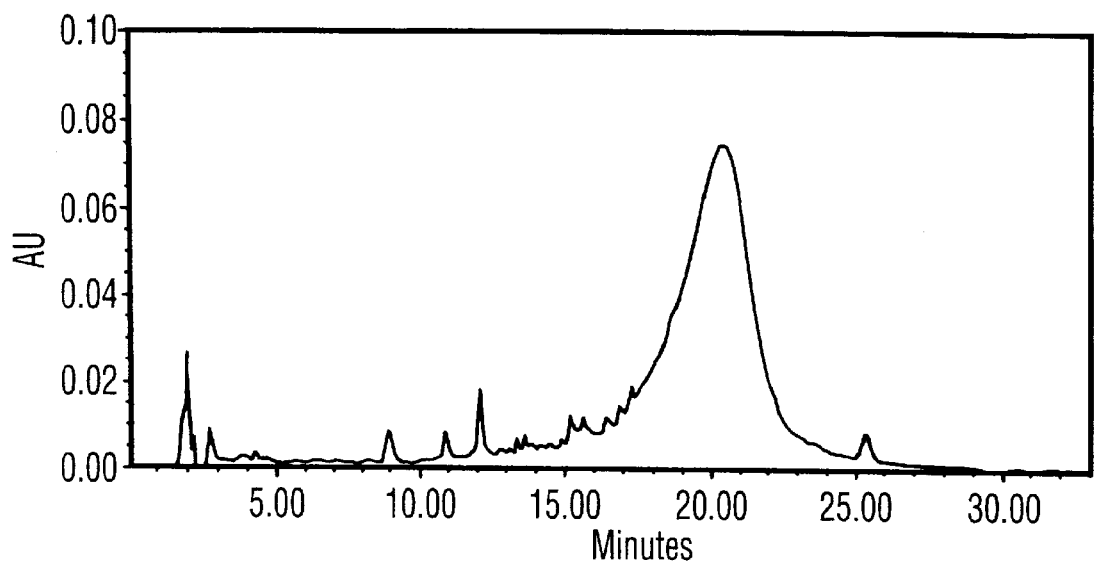
FIG. 1A is a chromatogram of unprocessed ethanolic extract of flaxseed meal showing ultraviolet detection at 280 nm.

6 kg of flaxseed meal were extracted with a total of 60 L of 70% (v/v) aqueous ethanol at 20° C. with stirring for a total of 8 h. The extract was removed from the bulk wet residual meal solids by filtration. A portion of the extract was then pumped through a regenerated cellulose ultra filtration membrane (Amicon Corp.) having a nominal molecular weight cut-off (NMCO) of 30,000 Daltons and above to retain the complex while eliminating the lower molecular weight species such as sugars, amino acids, small peptides, salts, cyanogenic glycosides and the like.

In this test, two different commercial samples of flaxseed meal (flaxseed meals "A" and "B") were used. Commercial flaxseed meal "A" contained 22.6 mg/g meal of SDG, 11.4 mg/g meal of 4-glucosylcoumeric acid (GCA) and 5.0 mg/g meal of glucosylferulic acid (GFA). After passing the meal "A" extract through the 30,000 NMCO membrane, the solids remaining after removal of all solvent in the retentate fraction were found to contain 370 mg/g solids of SDG, 160 mg/g solids of GCA (measured as methyl ester), 50 mg/g solids of GFA (measured as methyl ester) and 96 mg/g solids of HMGA (measured as its dimethyl ester).

The extract from commercial flaxseed meal "B" after similar treatment contained 340 mg/g solids of SDG, 95 mg/g solids of GCA (measured as methyl ester), 45 mg/g solids of GFA (measured as methyl ester) and 96 mg/g solids of HMGA (measured as its dimethyl ester). For both of the above flaxseed meal samples, the increase in concentration of the desired products in the solids compared to the starting meal was about 20 fold.

EXAMPLE 2

6 kg of commercial flax meal were extracted as described in Example 1. The extract was circulated through an apparatus containing a spiral wound membrane (Amicon Corp.) with an exclusion limit of 30,000 Daltons and above to retain the SDG containing complex while eliminating the lower molecular weight species such as sugars, amino acids, small peptides, salts, cyanogenic glycosides and the like. The circulation was continued until the retentate was reduced to about 30 L whereupon the retentate was diluted with fresh aqueous alcohol to the original volume of 60 L. Further circulation was continued to the point where the retentate was again reduced to about 30 L. The retentate was again diluted to the original volume of about 60 L. The circulation was continued until the volume was reduced to about 30 L. Care was taken not to reduce the volume to the point where solids appeared in the retentate, and which might foul the membrane. The retentate was further concentrated by evaporation under reduced pressure, to reduce the content of alcohol and the concentrate was recovered as a liquid concentrate.

A portion of the retentate was also dried into powder form. It had the appearance of a pale off-white solid.

EXAMPLE 3

The liquid concentrate obtained from Example 2 was passed through a size exclusion resin (Sephadex LH-20). The gel matrix was washed with fresh solvent sufficient only to elute the complex and to maximize the retention of the remaining and residual non desired components. The eluted complex was then concentrated by evaporation.

EXAMPLE 4

In order to show the variability in concentration of secondary plant metabolites depending upon environment, growing location and cultivar, a series of tests were conducted on cultivars of different sources. They were analyzed for content of SDG, 4-glucosylcourmarin acid (GCA) and 4-glucosylferulic acid (GFA). Both GCA and GFA were determined by liquid chromatography as their methyl esters. A summary of average SDG, GCA and GFA concentration in defatted flaxseed meal is presented in Table 1.

TABLE 1

| Cultivar | SDG | GCA | GFA |
|---|---|---|---|
| AC Emerson | 16.6 | 6.2 | 4.4 |
| AC Linora | 19.3 | 6.8 | 3.1 |
| AC McDuff | 14.1 | 2.7 | 3.8 |
| Flanders | 12.3 | 5.6 | 3.8 |
| Linola 947 | 22.6 | 11.4 | 5.0 |
| Linola 989 | 21.5 | 6.9 | 5.1 |
| McGregor | 18.5 | 8.0 | 4.6 |
| Norlin | 18.6 | 5.0 | 3.0 |
| Omega | 18.5 | 5.6 | 4.0 |
| Somme | 18.0 | 5.4 | 3.1 |
| Vimy | 18.9 | 0.2 | 1.1 |

EXAMPLE 5

Further chromatographic analyses were conducted on different alcoholic extracts of flaxseed meal. The first was an alcoholic extract as obtained in Example 1 without further processing. The second was permeate and retentate from passing the alcoholic extract through a 30,000 NMCO membrane. The third was the permeate and retentate from passing the alcoholic extract through a 100,000 NMCO membrane.

The samples were tested using a first test comprising ultraviolet detection and a second test comprising evaporative light scattering detection (ELSD). The ultraviolet detection is suited for compounds that have significant light absorption in the wavelength range of 200 to 400 nm, including the complex of the invention. The ELSD is suited for detecting compounds such as sugars, salts, aliphatic cyanogenic glycosides, etc., which have little absorption in the normal UV range measured.

Figure 1B:
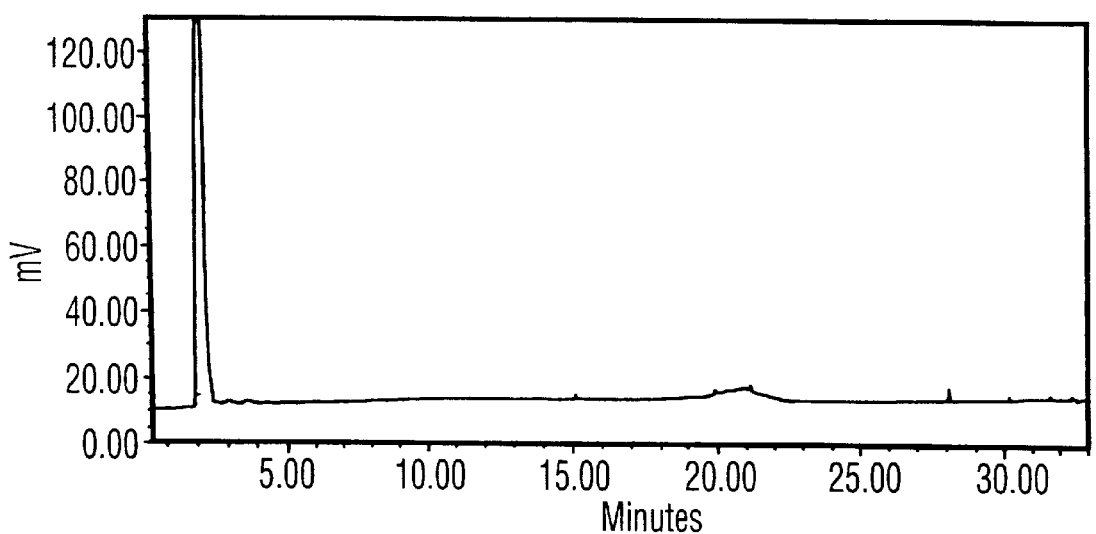
FIG. 1B is a chromatogram of a unprocessed ethanolic extract of flaxseed meal showing evaporative light scattering detection.

FIG. 1A shows the ultraviolet detection of the unprocessed extract. It has a substantial peak at about 21 minutes which is the complex that contains the SDG, cinnamic acid derivatives and the glutaric acid derivative. FIG. 1B is the evaporative light scattering detection of the same extract. A substantial peak is seen at about 2 minutes which is where one would expect sugars and salts to come as they are not retained on the reverse phase chromatographic column. The column was eluted with aqueous acetonitrile with a trace of trifluroacetic acid with the percentage of acetonitrile increasing the time. The complex is visible as a slight deflection on the baseline.

Figure 2A:
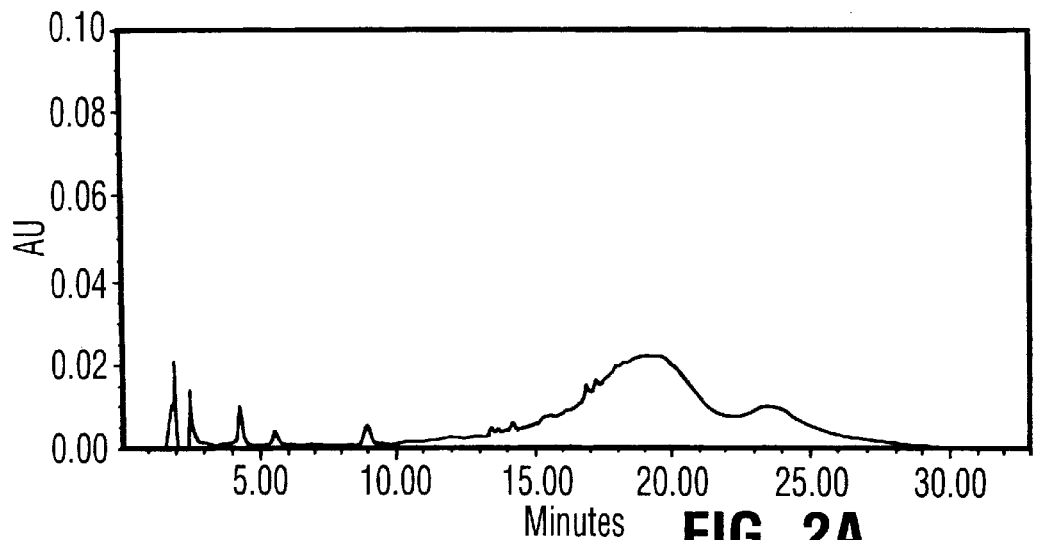
FIG. 2A is a chromatogram showing ultraviolet detection at 280 nm of permeate from an ethanolic extract of flaxseed meal after processing with a 30,000 NMCO filter.
Figure 2B:
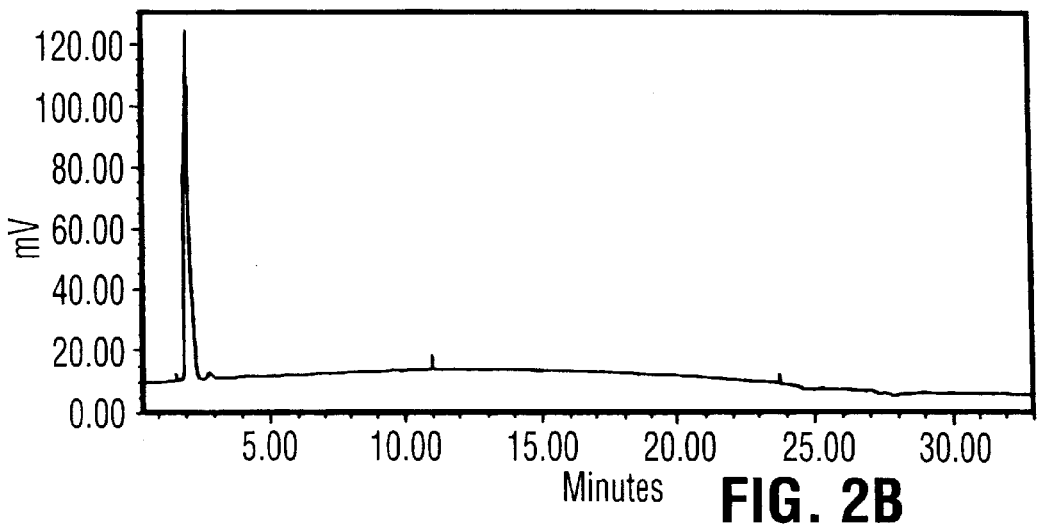
FIG. 2B is a chromatogram showing evaporative light scattering detection of permeate from an ethanolic extract of flaxseed meal after processing with a 30,000 NMCO filter.
Figure 2C:
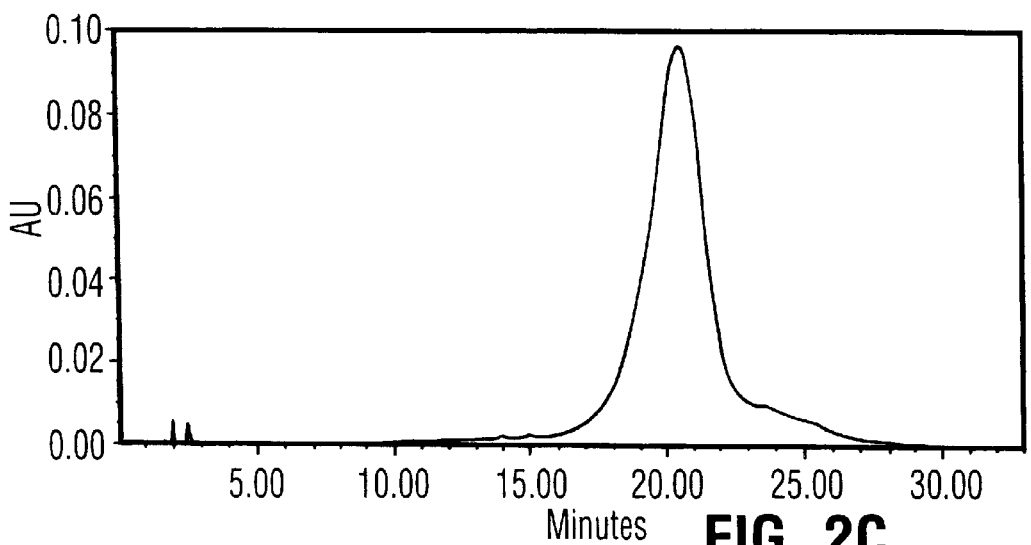
FIG. 2C is a chromatogram showing ultraviolet detection at 280 nm of retentate from an ethanolic extract of flaxseed meal after processing with a 30,000 NMCO filter.
Figure 2D:
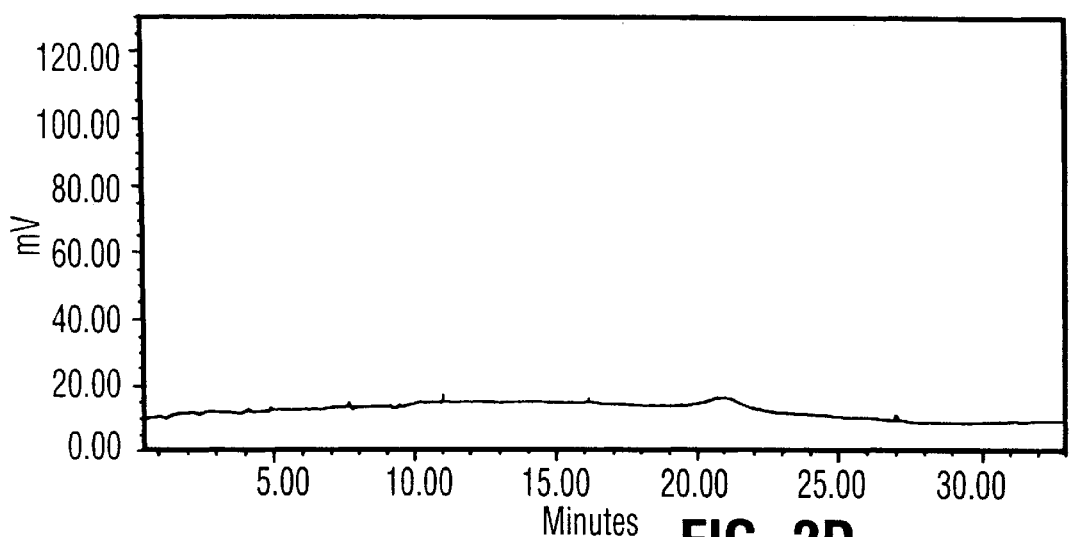
FIG. 2D is a chromatogram showing evaporative light scattering detection of retentate from an ethanolic extract of flaxseed meal after processing with a 30,000 NMCO filter.

FIG. 2A is the UV detection (280 nm) of the permeate from the 30,000 NMCO (normal molecular weight cutoff) membrane. It contains some UV absorbing materials but they occur at a slightly earlier elution time. FIG. 2B is the ELSD detection showing a strong early peak indicating that the low molecular weight substances were passing through the membrane and no peaks at 21 minutes for the complex. FIG. 2C is the UV of the retained material and shows and intense UV absorption. FIG. 2D shows that there is essentially none of the low molecular weight substances and again shows a small peak at 21 minutes for the complex.

Figure 3A:
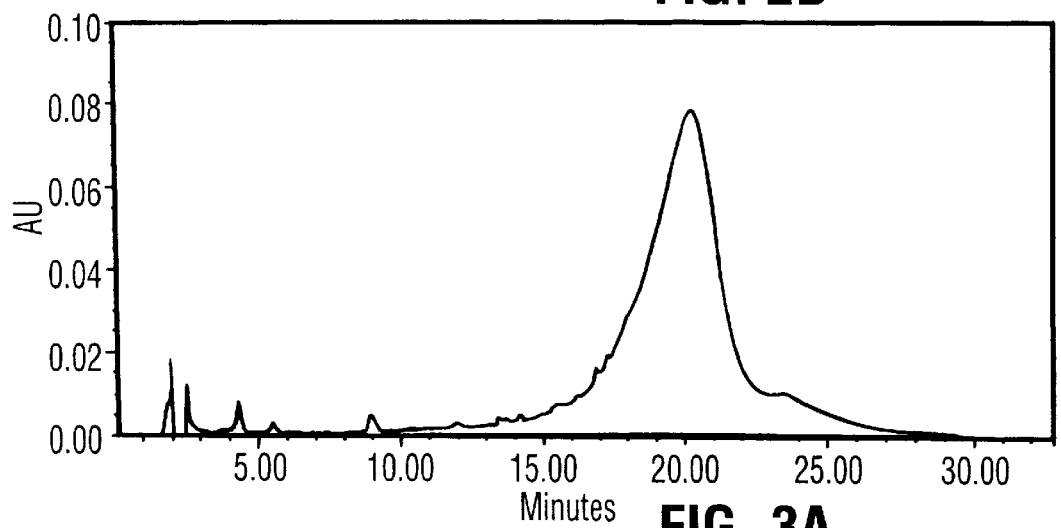
FIG. 3A is a chromatogram showing ultraviolet detection at 280 nm of permeate from an ethanolic extract of flaxseed meal after processing with a 100,000 NMCO filter.
Figure 3B:
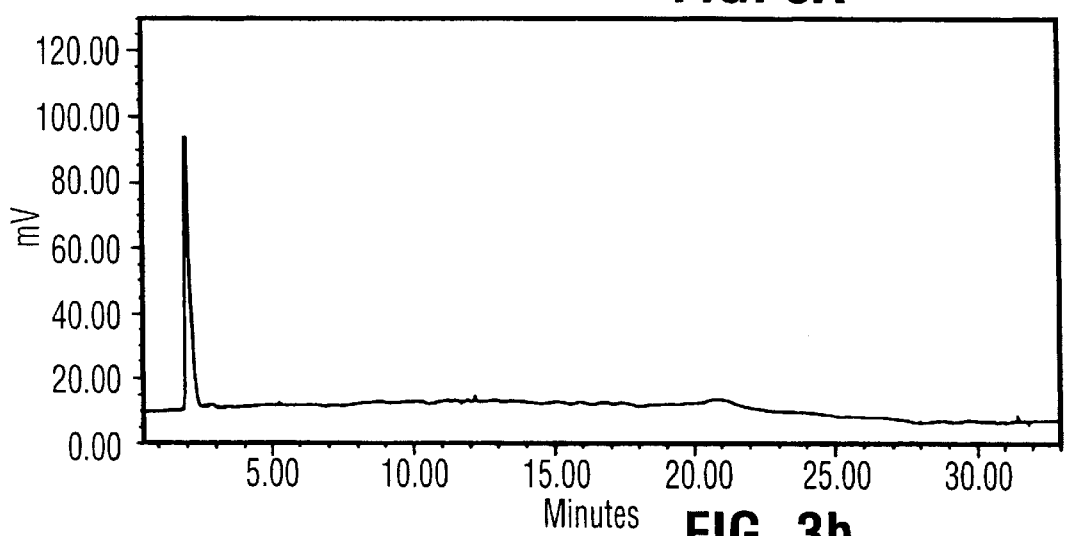
FIG. 3B is a chromatogram showing evaporative light scattering detection of permeate from an ethanolic extract of flaxseed meal after processing with a 100,000 NMCO filter.
Figure 3C:
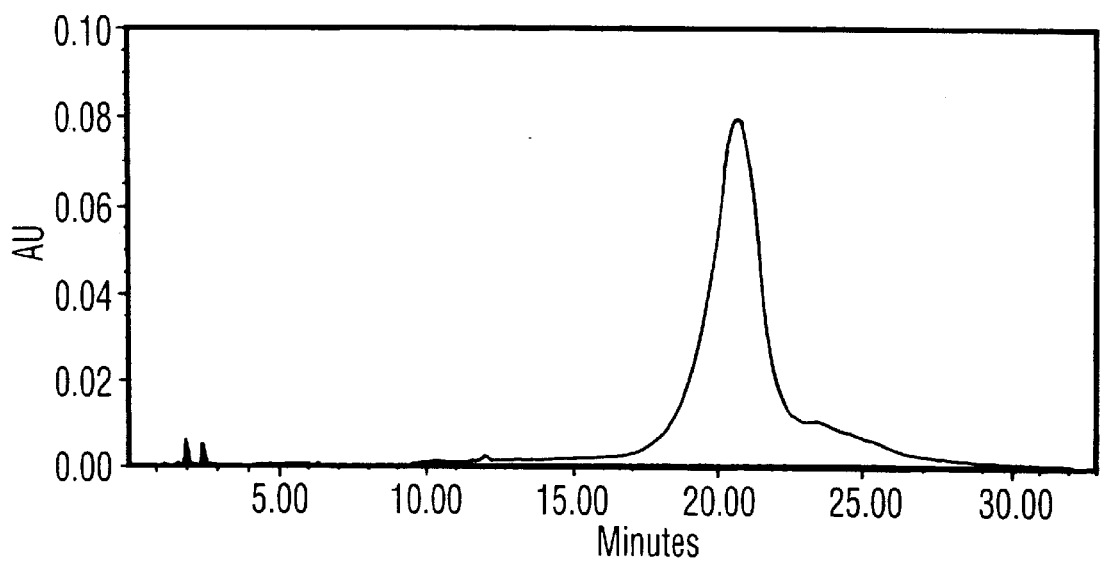
FIG. 3C is a chromatogram showing ultraviolet detection at 280 nm of retentate from an ethanolic extract of flaxseed meal after processing with a 100,000 NMCO filter.
Figure 3D:
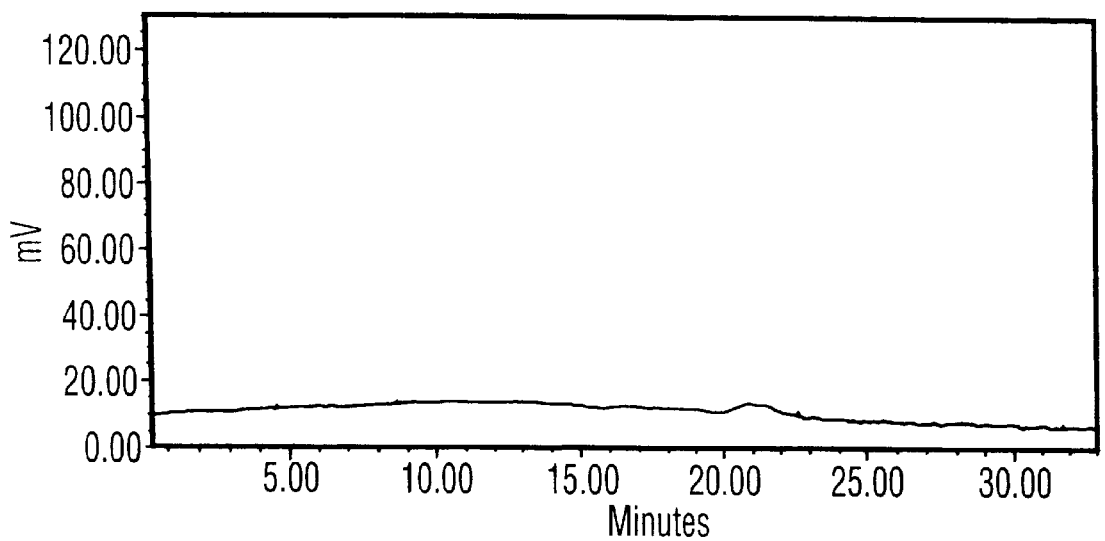
FIG. 3D is a chromatogram showing evaporative light scattering detection of retentate from an ethanolic extract of flaxseed meal after processing with a 100,000 NMCO filter.

FIG. 3A is the permeate from a 100,000 NMCO membrane. It shows that there is substantial UV absorption indicative of passage of the complex through the membrane. FIG. 3B again shows a strong signal for the low molecular weight substances in the permeate. The presence of the complex is shown on close examination. Thus the 100,000 NMCO membrane is not effectively retaining the complex. FIG. 3C is the UV trace of the retentate and shows the presence of the complex, while FIG. 3D shows that there is no low molecular weight materials present in the retentate.

This shows that the complex is effectively retained on a 30,000 NMCO membrane, but is not effectively retained on a 100,000 NMCO membrane. Since the rate of filtration usually slows with lower NMCO membranes, it is preferable to use the largest cut-off possible that does not result in substantial loss of high molecular weight substances.

EXAMPLE 6

6 kg of commercial flax meal were extracted as described in Example 1. A portion of the extract was passed over a bed of a gel permeation support matrix of the Sephadex LH-20 type. The low molecular weight components are substantially retained within the pores of the matrix as co-extractives while allowing the larger SDG containing complex to pass through. The gel matrix was washed with fresh solvent sufficient only to elute the complex and to maximize the retention of the non-desired components (co-extractives).

The fractions containing the high molecular weight complex and the low molecular weight co-extractives from the aqueous ethanolic extract were subjected to chromatographic analyses and the results are shown in FIGS. 4A–4D.

Figure 4A:
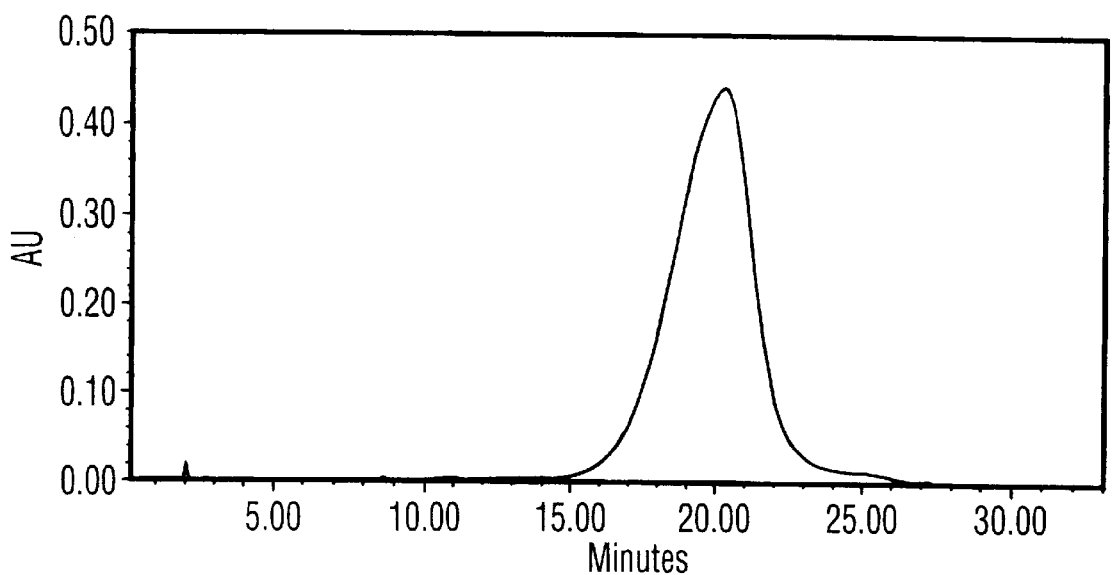
FIG. 4A is a chromatogram showing ultraviolet detection at 280 nm of the fraction containing high molecular weight complex from an aqueous ethanolic extract of flaxseed after separation by gel permeation resin.
Figure 4B:
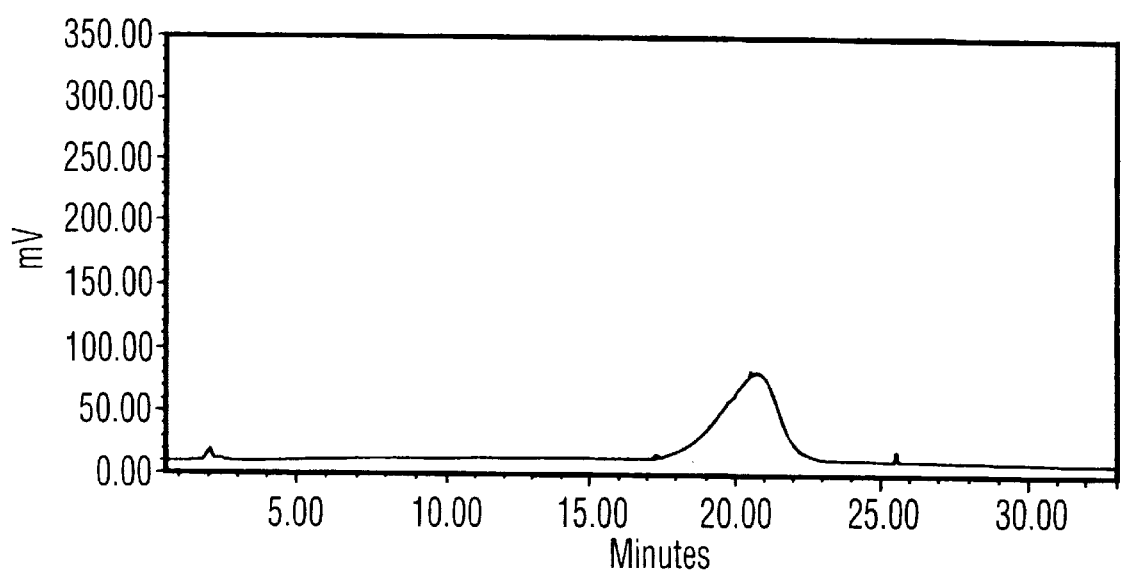
FIG. 4B is a chromatogram showing light scattering detection of the fraction containing high molecular weight complex from an aqueous ethanolic extract of flaxseed after separation by gel permeation resin.
Figure 4C:
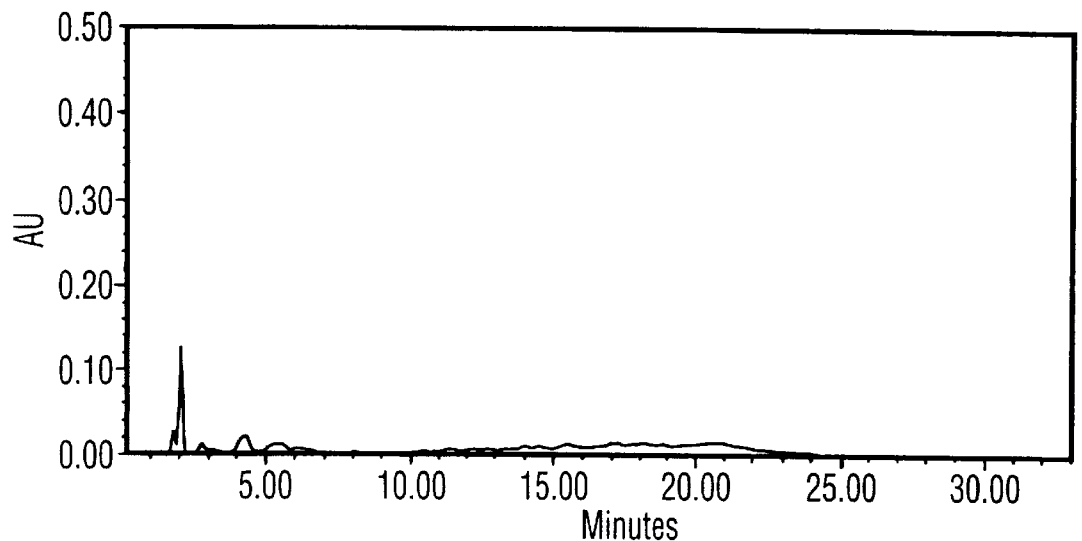
FIG. 4C is a chromatogram showing ultraviolet detection at 280 nm of the lower molecular weight co-extractives from an aqueous ethanolic extract of flaxseed after separation by gel permeation resin.
Figure 4D:
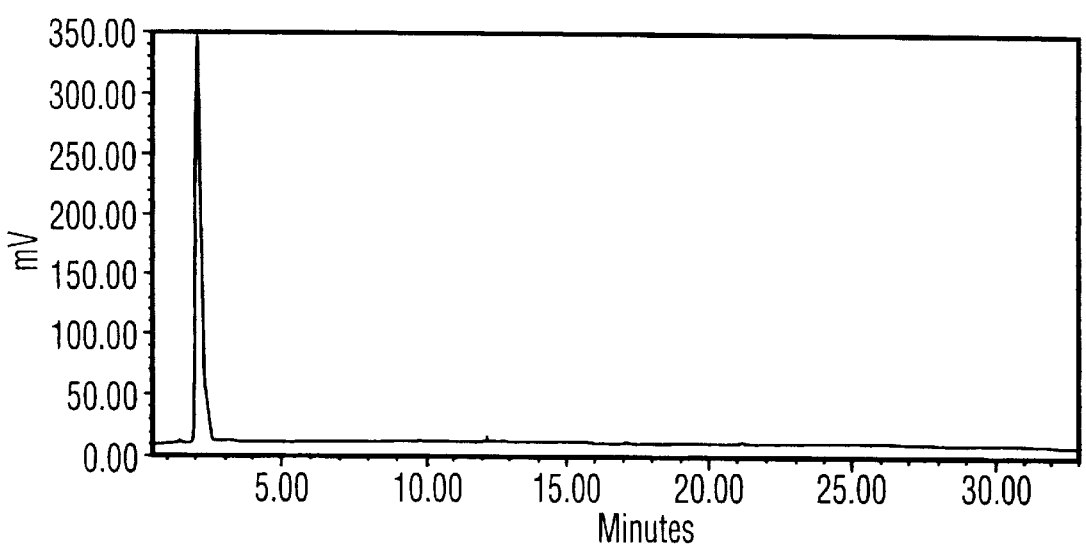
FIG. 4D is a chromatogram showing evaporative light scattering detection of the low molecular weight co-extractives from an aqueous ethanolic extract of flaxseed after separation of gel permeation resin.

FIG. 4A is the material not retained by the gel permeation resin. It shows intense UV absorption at 21 minutes, indicating the presence of the high molecular weight complex. FIG. 4B is the ELSD detection for the material not retained, showing that there is essentially none of the low molecular weight substances and showing a small peak at 21 minutes for the complex. FIG. 4C is the UV for the material retained by the resin and shows little UV absorbing materials. FIG. 4D shows a strong early peak indicating that the low molecular weight co-extractives were retained by the resin.

In the above Examples, in order to analyze for SDG content, the products were first hydrolyzed and processed as described by Westcott and Muir, U.S. Pat. No. 5,705,618. Cyanogenic glycosides were analyzed by first treating the cyanogenic glycosides with beta-glucuronidase and detecting the free cyanide ion with a Microquant Cyanide Test Kit (Merck). Nitrogen was determined by the Kjeldahl method. HMGA was determined by using gas chromatography-mass spectrometry.

What is claimed is:

1. A process for obtaining a substantially pure complex derived from flax, said complex containing secoisolariciresinol diglucoside, cinnamic acid glycosides and hydroxy methyl glutaric acid, which comprises obtaining an aqueous aliphatic alcoholic extract from flax and subjecting this aqueous extract to ultrafiltration using an ultrafiltration membrane whereby low molecular weight species remain with a filtrate and higher molecular weight species comprising the substantially pure complex are retained on the ultrafiltration membrane.

2. A process according to claim 1 wherein the ultrafiltration is carried out for a size exclusion of about 30,000 Daltons or greater.

3. A process according to claim 2 wherein the size exclusion is in the range of about 30,000 to 100,000 Daltons.

4. A process according to claim 2 wherein the retentate from the ultrafiltration containing the substantially pure complex is concentrated to form a liquid concentrate.

5. A process according to claim 2 wherein the retentate from the ultrafiltration containing the substantially pure complex is dried to form a dry powder.

6. A process according to claim 4 wherein the retentate is further fractionated using a column containing a solid support of size exclusion type or gel permeation resins.

7. A process according to claim 6 wherein the fraction from the size exclusion type or gel permeation resins containing the substantially pure complex is concentrated to form a liquid concentrate.

8. A process according to claim 6 wherein the fraction from the size exclusion type or gel permeation resins containing the substantially pure complex is dried to form a dry powder.

9. A process for obtaining a substantially pure complex derived from flax, said complex containing secoisolariciresinol diglucoside, cinnamic acid glycosides and hydroxy methyl glutaric acid, which comprises obtaining an aqueous aliphatic alcoholic extract from flax and subjecting this aqueous extract to fractionation on a column containing a solid support of size exclusion or gel permeation resins whereby a higher molecular weight species are separated from low molecular weight species, the higher molecular weight species comprising the substantially pure complex.

10. A process according to claim 9 wherein the fraction from the fractionation containing the substantially pure complex is concentrated to form a liquid concentrate.

11. A process according to claim 9 wherein the fraction from the fractionation containing the substantially pure complex is dried to form a dry powder.

12. A substantially pure complex derived from flaxseed and containing secoisolariciresinol diglucoside, cinnamic acid glycosides and hydroxy methyl glutaric acid, said complex having a nominal molecular weight of at least 30,000.

13. A complex according to claim 12, having a nominal molecular weight within the range of 30,000 to 100,000.

14. A complex according to claim 12 in the form of a liquid concentrate.

15. A complex according to claim 12 in the form of a dry powder.

* * * * *